20# United States Patent Office 2,959,560
Patented Nov. 8, 1960

2,959,560

SYNTHETIC RUBBER COMPOSITIONS

William B. Watson, Park Forest, Ill., assignor to Sinclair Refining Company, New York, N.Y., a corporation of Maine No Drawing. Filed Apr. 26, 1957, Ser. No. 655,190

5 Claims. (Cl. 260—27)

This invention relates to plasticized and extended synthetic rubber compositions and more particularly to synthetic rubber compositions containing a petroleum resin derived from a Pennsylvania-type crude oil.

It is known that in the processing of rubber-like materials or elastomers, much difficulty arises in plasticizing and softening these substances prior to subjecting them to various milling and molding operations. For example, in the preparation of butyl type polymers unsaturation is at a minimum and consequently plasticizers which have a high degree of unsaturation are unsuitable because the polymer is deprived of curatives during vulcanization. Moreover, during vulcanization and processing of these polymers, various plasticizing agents often volatilize and their desired properties are not obtained in the vulcanizate.

In accordance with this invention, I have found that butyl rubber may be plasticized and extended by the use of a petroleum resin obtained from a crude oil, and more particularly the resinous fraction yielded in the raffinate phase from the propane treatment of a Pennsylvania reduced crude. These resins are generally characterized as having a Saybolt Universal viscosity at 210° F. of at least about 500 seconds and an aniline point of at least about 115° C. Due to their characteristics of low volatility, low unsaturation and high molecular weights, these resins have been found particularly valuable for providing synthetic rubber compositions having good tensile strength, elongation and other valuable properties. The high molecular weight of the resin affords a basis for compatibility with the polymer and effects less softening whereby the addition of larger quantities of plasticizer can be used to reduce compound costs. The resins do not vaporize when subjected to processing and their low unsaturate character insures the polymer of curatives during vulcanization. The resins are further desirable since for special applications their low unsaturation can be further reduced by mild hydrogenation processes carried out under low pressures of 500 p.s.i. or less.

In order to obtain the petroleum resins which are added to butyl rubber compositions as plasticizers and extenders, a topped or reduced crude distillate from a Pennsylvania crude oil is contacted with propane at an elevated temperature under a pressure sufficient to maintain the solvent in liquid phase. The two resulting liquid phases are then separated and stripped free of solvent to yield a high viscosity resin material from the propane-insoluble raffinate phase and a deresined extract oil from the propane-soluble phase. The reduced crude oil may be contacted with propane at a ratio of propane to oil varying from about 5.0 to 20.0, preferably about 12.0 to 17.0, at a temperature ranging from about 60 to 200° F. To maintain the propane in the liquid state the treatment is usually carried out at pressures of the order of 450 p.s.i. or other suitable pressure. Typical resins which are obtained in the resulting propane-insoluble raffinate phase have an SUS viscosity at 210° F. of about 500 to 25,000 seconds, a viscosity index of about 85 to 120, and an aniline point between about 115 and 175° C.

The synthetic rubber-like substances to which the resins are added in accordance with this invention are well-known polymeric butyl materials obtained by polymerizing an aliphatic iso-mono-olefin such as isobutylene together with a small amount of an aliphatic polyolefinic monomer of 4 to 6 carbon atoms such as the diolefins isoprene, piperylene, butadiene, and the like. 99–40 weight percent of the iso-mono-olefin is mixed with 1 to 60 weight percent of the polyolefin, and for most purposes the conjugated diolefins having from 4 to 6 carbon atoms per molecule are preferred. Generally, in the preparation of the rubber-like substance, the olefinic material is cooled to temperatures from 0° C. to −78° C. or as low as −127° C., and the polymerization is carried out in the presence of a Friedel-Crafts catalyst dissolved in a low freezing solvent such as carbon disulfide, methyl chloride, or the like. Upon completion of the polymerization, the solid polymer is separated from the liquid residue of the reaction mixture and brought up to room temperature, after which it is washed and purified. The polymers obtained are of relatively high molecular weight, have low iodine members, and are reactive with sulfur in curing operations to afford valuable rubber-like compositions.

Generally, the amount of propane-insoluble resin present in the rubber composition will vary from about 5 to 50 parts by weight per 100 parts of rubber polymer depending upon whether or not the purpose of the resin is for plasticizing or extending. In the latter instance, and depending upon the molecular weight of the base polymer as well as the Mooney plasticity desired in the uncured polymer, the resin can be added in amounts ranging from about 10 to 50 parts of resin per hundred parts of butyl polymer. The resin can be added by solution or emulsion mixing, or by direct mixing of the resin and polymer on a roll mill or in a Banbury mixer. In this manner, the quantity of polymer produced is extended and heat buildup in commercial products subsequently produced is lessened. When it is desired to plasticize the butyl composition during compounding, the resin can be mixed with the polymer and other common ingredients such as vulcanizing agents, accelerators, anti-oxidants, activators, etc., in approprotion of about 5 to 25 parts of resin per 100 parts of polymer. Curing may be carried out at temperatures ranging from about 200 to 400° F. for a period of time sufficient to yield valuable rubber-like material having improved low temperature performance characteristics, tensile strengths ranging upwards from 1000 pounds per square inch and elongations at break of at least 300 percent.

Filler and pigment materials which may be used for compounding purposes include carbon black, calcium carbonate, clays, calcium silicate, magnesium carbonate, zinc oxide, lithopone, magnesium oxide, mica and soapstone. Depending upon the desired use of the composition, the total filler content ranges from about 0 to 150 parts of filler per hundred parts of polymer.

Anti-oxidants and anti-ozonants commonly used with natural rubber and butadiene-styrene polymers can also be employed if desired. Accelerators of the thiuram sulfide and dithiocarbamate type are also desirable and for this purpose tetramethyl thiuram disulfide and zinc dimethyldithiocarbamate can be advantageously used in proportions of 1 to 1.5 parts up to 3.0 parts per hundred parts of polymer. Auxiliary accelerators such as the aromatic thiazoles, guanidine, and the aldehyde-amine type may also be employed in amounts of 0.5 to 1.0 parts per hundred parts of polymer.

Suitable activators which are employed include metallic oxides and fatty acids such as zinc oxide and stearic acid. These materials are present in quantities ranging from 1.0 to 10.0, preferably 2.0 to 5.0 parts per hundred parts of polymer so as to activate the accelerators and prevent reversion. Vulcanizing agents, particularly sulfur, are also necessary in quantities up to 10.0 parts per hundred parts of polymer and generally at a concentration of 1.0 to 2.5 parts per hundred parts of polymer. If desired, stiffeners such as para-dinitrosobenzene can be included in the compositions in quantities up to 0.2 part per hundred parts polymer.

The synthetic rubber-like compositions of the present invention may be illustrated by the following example which is given by way of illustration and not by way of limitation.

*Example I*

A resin fraction was produced by treating a Pennsylvania topped crude with propane at a ratio of propane to oil of fifteen to one at a top tower temperature of 160° F. and a bottom tower temperature of 130° F. The treatment was carried out at a pressure of 450 p.s.i. in a continuous countercurrent tower, and the resin material yielded from the propane-insoluble phase analyzed as follows:

| | |
|---|---|
| Gravity, °API | 20.8 |
| Viscosity, SUS/210° F. | 910 |
| Viscosity Index | 105 |
| Aniline point °C | 137 |
| Flash point °F | 660 |
| Average mol. wt. | 1,110 |

The resin was then compounded according to the following typical recipe:

| Composition: | Parts by weight |
|---|---|
| Butyl rubber [1] | 100.0 |
| Zinc oxide | 5.0 |
| Sulfur | 2.0 |
| HMF Carbon Black | 25.0 |
| SRF Carbon Black | 35.0 |
| Tetramethylthiuram disulfide | 1.25 |
| Mercaptobenzothiazole | 0.5 |
| Polyac (30% p-dinitrosobenzene, 70% insert mineral filler) | 0.5 |
| Resin, propane insoluble phase from Pa. reduced crude | 25.0 |
| | 194.25 |

Mooney plasticity (ASTM D-927), ML 4'/212° F., 54.0.

[1] A copolymer of isobutylene and isoprene (2-½ weight percent isoprene) having Mooney plasticity, ML 8' 212° F. of over 71.

After compounding, the composition was press cured for 15 minutes at 307° F. The following data illustrate the physical properties of the vulcanized product.

Tests on vulcanized composition:

| | |
|---|---|
| 300% Modulus (ASTM D-412), p.s.i. | 589 |
| 500% Modulus (ASTM D-412), p.s.i. | 1,010 |
| Tensile strength at break (ASTM D-412), p.s.i | 1,835 |
| Elongation at break (ASTM D-412), percent | 760 |
| Set at break (ASTM D-412), percent | 25 |
| Shore A Hardness (ASTM D-676) | 48 |
| Brittle point (ASTM D-746), °C | −45 |

I claim:

1. A composition of matter consisting essentially of synthetic butyl rubber and about 5 to 50 parts per hundred parts of said rubber, of a butyl rubber plasticizing and extending agent which is a resin having the approximate following properties:

| | |
|---|---|
| Aniline point °C | 115 to 175 |
| Viscosity, (SUS at 210° F.) | 500 to 25,000 |
| Viscosity Index | 85 to 120 | said resin being obtained in the propane-insoluble raffinate phase obtained in the propane treatment of a Pennsylvania reduced crude.

2. The composition of claim 1 wherein the rubber is a copolymer of isobutylene and isoprene.

3. The composition of claim 2 wherein the resin is present in an amount ranging from about 10–50 parts per hundred parts of copolymer.

4. The composition of claim 2 wherein the resin is present in an amount ranging from about 5–25 parts per hundred parts of copolymer.

5. The composition of claim 2 wherein the composition contains a vulcanizing agent.

References Cited in the file of this patent

UNITED STATES PATENTS

| 2,594,217 | Rogers et al. | Apr. 22, 1952 |
| 2,638,460 | Crouch et al. | May 12, 1953 |

OTHER REFERENCES

"Technigram," Standard Oil Company of New Jersey, Del., Sal-En-69-1, November 17, 1947.

Nelson; "Petroleum Refinery Engineering," 3rd edition, McGraw-Hill (1949), pages 231–233, 308–310, and 331–334.